Nov. 12, 1935.  L. A. MAPEL  2,020,560
INDICATING INSTRUMENT
Filed Oct. 15, 1928   2 Sheets-Sheet 1

Inventor:
Lewis A. Mapel,
By John N Bruninga
His Attorney.

Nov. 12, 1935.  L. A. MAPEL  2,020,560

INDICATING INSTRUMENT

Filed Oct. 15, 1928    2 Sheets—Sheet 2

Inventor:
Lewis A. Mapel,
by John H. Bruninga
His Attorney.

Patented Nov. 12, 1935

2,020,560

UNITED STATES PATENT OFFICE 2,020,560

INDICATING INSTRUMENT

Lewis A. Mapel, St. Louis, Mo., assignor to The Automatic Appliance Company, St. Louis, Mo., a corporation of Missouri Application October 15, 1928, Serial No. 312,542

6 Claims. (Cl. 73—110)

This invention pertains to indicating instruments, such as may be used to indicate the variation in a given force or quantity. More particularly, the invention pertains to the indicating mechanism of such an instrument.

One of the objects of this invention is to provide an instrument which will indicate the variation of a given force or quantity, such indication being made on an extended scale which is easy to read.

Another object is to provide such an instrument in which the movement of the indicating element is substantially proportional to the magnitude of the force or quantity indicated, so that the same may be read on a scale having substantially uniform divisions.

Another object is to provide such an instrument in which the magnitude of the movement of the indicating element, corresponding to a given increment of the force or quantity indicated, may be adjusted so as to adapt the mechanism accurately to a given scale.

Another object is to provide indicating mechanism in which the actuating element, which responds directly to variations in the force or quantity, is relieved of a substantial part of the force opposing the variation in the force or quantity indicated.

Another object is to provide such an instrument which will be of robust construction, capable of withstanding hard usage without alteration in its calibration.

Further objects will appear from the following description, taken in connection with the accompanying drawings, in which—

Figure 1:
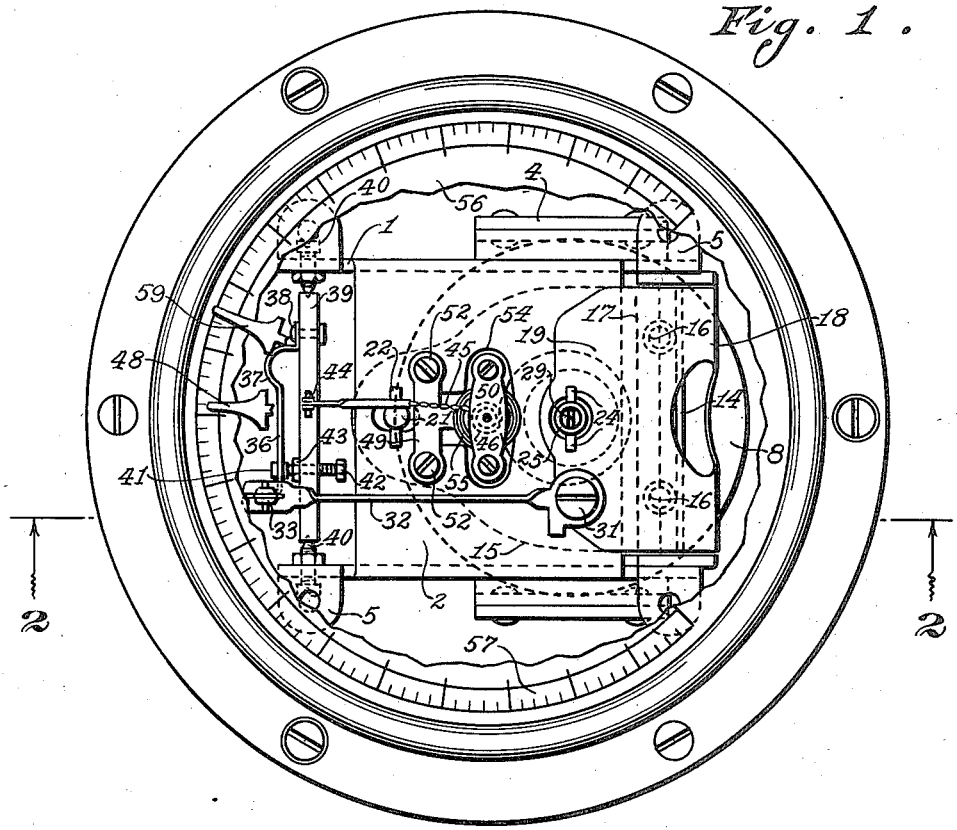
Figure 1 is a top view of an instrument embodying this invention, in which part of the scale has been broken away in order to show the underlying mechanism.

The invention is illustrated in the drawings as applied to a gauge for indicating fluid pressure—as, for instance, air pressure— and in which the actuating element responsive to the force to be indicated is in the form of a diaphragm. Such an instrument may be applied, for instance, to the indication of the depth of liquid in a tank by providing an air chamber submerged in the liquid in such tank and conducting the air in such chamber, which is under a pressure determined by the depth of the liquid, to the diaphragm of the instrument.

In accordance with the ordinary practice, the resiliency of the diaphragm is opposed to the pressure of the air, and the deflection of the diaphragm is determined by the establishment of a balance between the air pressure and the resisting force of the diaphragm. In accordance with the present invention, the diaphragm is relieved of a susbtantial portion of the force necessary to resist the pressure of the air, such force being absorbed by other members of the mechanism. Accordingly, a considerably greater range of pressure can be accommodated by a given diaphragm than would be possible if the diaphragm itself were compelled to resist the entire pressure.

In cases where the resilient force of the diaphragm alone is opposed to the actuating pressure, the range of pressure which can be indicated by the instrument is fixed by the dimensions of the diaphragm. In accordance with the present invention, the range of pressures which may be indicated can be varied by proper adjustment of the other elements of the mechanism which take up the excess force of the actuating pressure. Accordingly, a very much greater range of pressures can be handled by a single diaphragm, and the movement of the indicating element over the scale, corresponding to a given change in the actuating force, can be adjusted so that the instrument may be adjusted to follow accurately a given scale.

Referring now to the accompanying drawings, which illustrate the invention as applied to an air pressure gauge, 1 designates a frame, which may be constructed of sheet metal formed to appropriate shape, as shown in the drawings. The frame comprises, generally, a top plate 2, a bottom plate 3 and side plates or arms 4. The frame may further be provided with hangers 5, by means of which the mechanism may be mounted on a suitable face plate 6. Mounted on a supporting block 7 on the bottom plate 3 is a pair of diaphragms 8. These diaphragms may be of any suitable construction. In the accompanying drawings, they are shown as having radial, rather than circumferential, corrugations in order to provide a diaphragm whose rate of variation of deflection with variation of pressure is uniform. The diaphragms 8 are secured together at their margins 9 with an air-tight joint, and the space between them communicates through an aperture 10 with a passage 11 in the block 7, which passage in turn communicates with a tube 12 to which may be connected a flexible tube 13, by which the air pressure is conducted to the instrument from whatever source is to be indicated. The diaphragms 8, being flexible and resilient, will be distended or collapsed in accordance with the increase or decrease of air pressure in the space between them. As these diaphragms have radial corrugations they will have less tendency to change their shape with changes of temperature than if circumferential corrugations were used.

Figure 2:
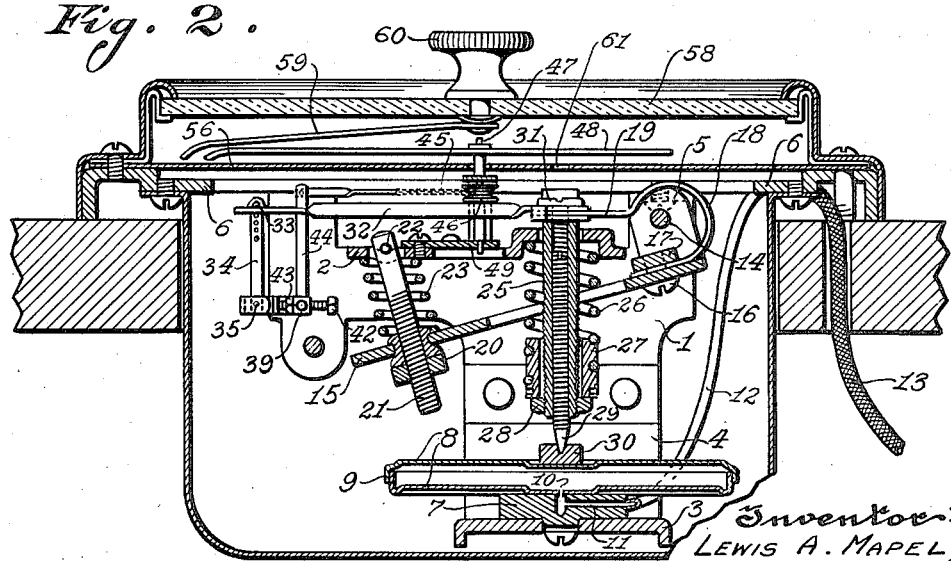
Figure 2 is a section on line 2—2 of Figure 1.
Figure 3:
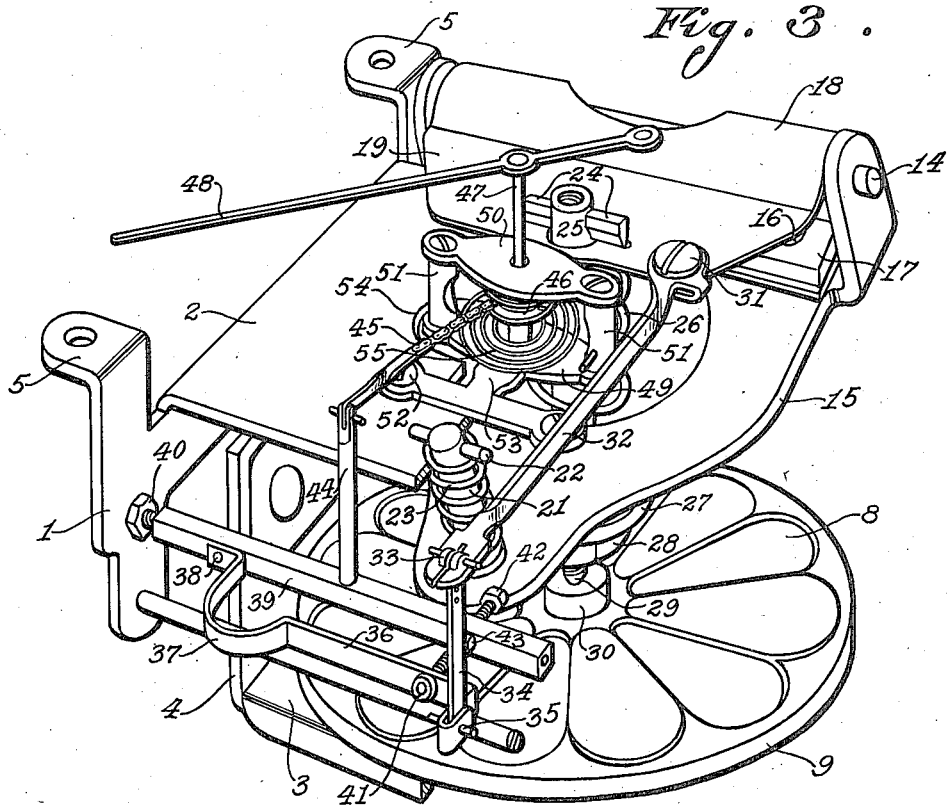
Figure 3 is a perspective view of the mechanism with parts broken away in order to show the parts therebeneath.

Pivoted on a shaft 14 mounted in the upper portion of the side plates 4 is an adjusting plate 15. Mounted on the plate 15, as by means of screws 16 engaging a clamping strip 17, is a flat spring 18. The spring 18 is formed with a portion thereof curved about the pivot 14 as shown in Figure 2, and a portion 19 thereof extending radially with respect to the pivot 14. Accordingly, movement of the portion 19 under flexure of the spring will take place as if such portion 19 were pivoted at 14. The lower end of the adjusting plate 15 is engaged by a nut 20 on an adjusting screw 21 pivoted at 22 on the top plate 2 of the frame. A spring 23, surrounding the screw 21 and bearing against the top plate 2 and the adjusting plate 15, maintains the latter plate firmly in adjusted position.

Pivoted on a pair of knife edges 24, engaging the portion 19 of the spring 18, is a hollow stud 25, which extends downwardly from its pivot point. A spring 26, surrounding the stud 25, bears at its upper end in a socket formed for that purpose in the top plate 2 of the frame. The lower end of the spring 26 has its end turns threaded into a helical groove in the outer cylindrical surface of a sleeve 27 fitting loosely over the stud 25 and bearing against an adjusting nut 28 which is screwed onto a thread on the outside of the stud 25. The spring 26 thus acts through the nut 28 upon the stud 25 to draw the same downwardly in opposition to the upward force exerted on said stud by the spring 18. The inner bore of the stud 25 is threaded to receive an adjusting screw 29, having a conical point adapted to engage a suitable socket in a thrust block or abutment 30 secured to the upper diaphragm 8. The screw 29 may be adjusted to engagement with the upper diaphragm so that movement of the diaphragm will actuate the stud 25 to give the same an up and down movement in response to variations in the air pressure. The stud 25 thus provides an actuated element which is moved in accordance with variations in the pressure to be indicated.

It will be seen that by means of the springs 18 and 26, which exert opposed forces thereon, the actuated element 25 of the indicating mechanism may be initially positioned under balanced forces. The magnitude of the initial forces exerted by these springs may be adjusted by means of the nuts 20 and 28, which control, respectively, the tensions exerted by the springs 18 and 26. This adjustment may be made with the screw 29 out of engagement with the abutment 30. The effect of such initial tensioning of the element 25 is to retain the same under mutually opposed tensions in its neutral or zero position. Movement of said element out of such position will be opposed by a force determined by the springs 18 and 26. The rate of variation of such resisting force with change of position of the element 25 will be determined by the sum of the corresponding rates of change of the forces exerted by the springs 18 and 26. This will be clear from the fact that as such movement progresses, the tension of one spring will be increased, while that of the other will be decreased, and, accordingly, the force required to cause such movement must be equal to the sum of such increase and decrease.

It will be seen, therefore, that as the force required to move the element 25 varies according to the extent of its movement, the "rate of variation" of this force or, in other words, the increase in force required to accomplish a movement of said element of unit distance—is determined by the strength of the springs 18 and 26. When the screw 29 is brought into engagement with the diaphragm 8, the resiliency of said diaphragm, of course, adds its effect to this rate of variation. But the strength of the springs 18 and 26 relatively to that of the diaphragms 8 may be made great enough so that the diaphragm itself will have a relatively slight effect. The rate of variation of the force required to move the element 25 may be adjusted in several ways. The smaller adjustments may be accomplished by screwing the sleeve 27 into the coils of spring 26 to a greater or less extent so that a greater or less number of turns of said spring are rendered inactive by being confined and held in the helical groove in said sleeve. Such adjustment, of course, changes the active length of the spring 26 and changes, correspondingly, the rate of variation of the force which it will exert. Greater adjustments in the rate of variation may be made by replacing one or both of the springs 18 and 26 by other springs of greater or less strength. In this way, an adjustment throughout a wide range of variation is obtainable.

The indicating element of the instrument is connected to be operated by the element 25 through connections adapted to multiply the movement thereof. Fixed at 31 to the spring 18 is an arm 32 which has pivoted thereto at 33 a link 34. The link 34 is pivoted at 35 to a flexible bracket 36. The bracket 36 has a bowed portion 37, in order to make the same flexible, and is rigidly secured at 38 to a shaft 39 pivoted at its ends on cone pointed screws 40. The bracket 36 has rotatably fixed thereto at 41 an adjusting screw 42, having threaded engagement with the shaft 39 and secured by a lock nut 43. By means of the screw 42, the bracket 36 may be adjusted relatively to the shaft 39, so as to vary the distance of the pivot 35 from said shaft, thereby varying the effective leverage at which the link 34 operates to turn said shaft. Fixed to the shaft 39 is a second arm 44, which has connected with its upper end a flexible chain 45, engaging a grooved pulley 46 on the spindle 47 which carries the indicating element in the form of a needle 48. The spindle 47 is mounted to rotate in suitable bearings in a sub-frame, comprising a lower plate 49, an upper plate 50 and supporting side posts 51. The plate 49 is secured at one or more points 52 to the top plate 2 of the frame and is provided with a narrow neck 53 between said fastening points and the bearings of the spindle 47. That part of the frame 49—50—51 which carries the spindle bearings is located over an aperture 54 in the plate 2. This aperture provides room for bending the frame at the neck 53 in any desired direction, so as to adjust the alinement of the spindle 47. A hair spring 55 is attached at one end to the spindle 47 and at the other to its supporting frame and operates to return the needle 48 to its zero position against the pull of the chain 45.

The spindle 47 extends through a central aperture in a scale plate 56 mounted on the face plate 6 and the needle 48 is mounted on the outside of the scale plate so as to be visible from the front of the instrument in the usual manner. The scale plate 56 may be provided with any suitable scale 57. A glass cover plate 58 may be mounted to cover and enclose the face plate 6. A set indicator 59, mounted on a manipulative button 60 on the cover plate 58 and frictionally held in adjusted position in any suitable manner, may be provided. Such a set indicator is useful in setting off any scale indication which it is desired to retain while the indicating needle 48 changes its position. For instance, in an instrument used to indicate the depth of liquid in a tank, such as a gasoline storage tank, the amount of liquid added when filling the tank may be determined by setting the set indicator 59 at the same indication as the needle 48 before starting to replenish the tank. When the replenishment of the tank is complete, the amount of liquid added may then be determined by the difference between the indications of the needle 48 and the indicator 59.

Operation of this instrument is as follows: Air pressure active in the chamber between the diaphragms 8 tends to force said diaphragms apart. The screw 29 having been adjusted to contact with the abutment 30, such force will act to move the element 25 from its neutral position against the opposition of the combined variation in tension of the springs 18 and 26 and the diaphragm 8. Movement of the actuated element 25 will move the arm 32, which in turn, through the link 34, will rotate the shaft 39 on its pivots, thereby swinging the arm 44. Movement of the arm 44 acts to tension or release the chain 45, so as to turn the needle 48 in one direction or the other in accordance with the direction of such change.

As the rate of variation of tension of the combined springs 18 and 26, together with that of the diaphragms 8, can be adjusted as previously described, the unit movement of the indicating element 48 may be adjusted to any desired value. By "unit movement" as used in this specification and the appended claims, is meant the extent of movement of the indicating needle 48 corresponding to a unit change of the force, such as the air pressure, which is to be indicated. As will be understood from previous description, said unit movement may be adjusted through a very wide range by adjustment of the springs 18 and 26 as specified.

Since the variation in tension of an ordinary spring is directly proportional to the deflection thereof from its point of zero tension, the movement of the indicating element will be directly proportional to the intensity of the force which acts upon the element 25. Accordingly, the scale 57 will have uniform divisions representing equal increments of air pressure. A diaphragm, such as the diaphragms 8, exerts a resistance to flexure, which is proportional to its deflection, only through a comparatively small range of deflection. In order, therefore, to increase the range of deflection in which the resistance of the diaphragm is proportional to its deoection, said diaphragm is, in accordance with the present invention, given an initial deflection or setting in a negative direction from its neutral position. This may be accomplished by suitable adjustment of the screw 29. Giving the diaphragm such an initial setting increases the range through which its resilient force is proportional to its deflection by practically double the normal amount. In other words, this range extends from the initial negative setting through its neutral or zero position to a corresponding positive deflection. Accordingly, the range through which a scale 57 of uniform divisions may be used is correspondingly increased.

Figure 4:
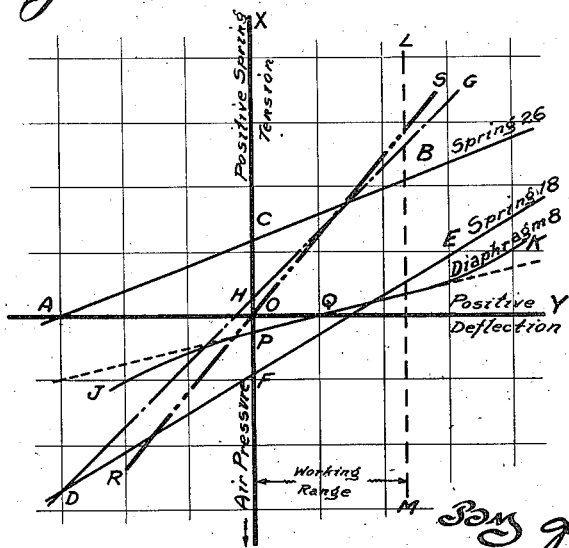
Figure 4 is a diagram representing a theory of operation.

Figure 4 is intended to illustrate in graphic form a theory of operation of this device. In this diagram values of spring tension are plotted vertically along the axis "X", while the values of deflection of the actuated element from its neutral or zero position are plotted horizontally along the axis "Y". The positive values of spring tension are measured upwardly from the origin "O". The positive direction of spring tension has been taken opposite to the action of the air pressure, which, accordingly, may be represented as acting downwardly or in a negative direction along the axis "X". Positive deflections are plotted to the right in the usual manner.

The variation in tension of the spring 26 with deflection is represented by the line AB. This spring acts positively or against the air pressure. It will be noted that this spring is initially tensioned at the point of zero deflection. This initial tension is represented by the distance OC (or displacement) of the actuated member 25. As previously pointed out, the tension of a spring is directly proportional to its deflection and, accordingly, the line AB is a straight line. The line DE represents the variation in tension of the spring 18 with change of deflection (or displacement) of the actuated member 25. This is also a straight line. This spring is also initially tensioned, but in a negative direction, the initial tension being represented by the distance OF. The initial tensions OC and OF act in opposite directions or senses, so that the actuated element is initially tensioned thereby in opposite senses. The combined action of the two springs 18 and 26 on the actuated element is represented by the line DG, which is the resultant obtained by addition of simultaneous tensions of the springs 18 and 26 as represented by the lines DE and AB, respectively. As the spring 26 is adjusted to a slightly greater initial tension than the spring 18, the line DG crosses the "X" axis at a point H slightly above the origin "O".

The curved line JK represents the variation in tension of the diaphragms 8 with change of deflection. It will be noted that this is not a straight line, but that it has a portion extending between the axis "X" and the vertical line LM which is substantially straight. The diaphragm is adjusted as described, so as to be offset from its neutral position in a negative direction at the "zero" position of the needle 48. Accordingly, the diaphragm will have an initial tension represented on the diagram by the distance OP in a negative direction, such tension being adjusted by manipulation of the screw 29. In other words, the neutral position of the diaphragm, represented by the point "Q" in Figure 4, is displaced in a positive direction from the neutral or zero point of adjustment of the actuated element, this latter point being at the origin "O" of the diagram. As the tension of the diaphragms 8 acts in combination with that of the springs 18 and 26, we must now combine the straight part of the line JK (indicated by dotted extensions in the diagram) with the resultant DG of the two spring tensions. Such combination gives us the final resultant represented by the line RS. This line represents the combined action of both springs and the diaphragms under change of deflection due to change in the air pressure. Of course, the working range of the instrument includes only that portion of the diagram lying between the "X" axis and the line LM. Within this range the variation in tension of the diaphragm is represented by a practically true straight line. It will be seen from the diagram that, on account of the initial offsetting of the diaphragm in a negative direction, the magnitude of the working range is practically doubled. In other words, if the diaphragm were not so offset, the range of the instrument would be limited to that portion of the diagram lying between a vertical line thru the point "Q" and the line LM.

In order to obtain this setting of the mechanism, the following procedure may be carried out. The nut 20 is screwed up on the screw 21 so as to compress the spring 23. Moving the nut in this direction moves the spring 18 and the arm 32 in such a way as to cause the indicating needle 48 to move in a positive direction around the scale 57. This adjustment of the nut 20 is continued until the needle 48 has made a complete revolution. The nut 28 is now screwed upon the sleeve 25. This puts tension upon the spring 26 and causes it in turn to tension the spring 18.

Now, since the action of the spring 26 is opposite to that of the spring 18, such manipulation of the nut 28 will operate to bring the needle 48 back around the scale in a negative direction. This adjustment may be made until the needle is brought back to its "zero" position. The nut 28 is now tightened up somewhat further so as to carry the needle 48 in a negative direction beyond the "zero" point of the scale 57. During this adjustment the screw 29 has been kept clear of the abutment 30. This screw may now be screwed down in the sleeve 25 so as to engage the abutment 30. The adjustment is continued until the diaphragms 8 are compressed. The pressure of these diaphragms acts to move the needle 48 in a positive direction and the adjustment is continued until the needle reads "zero" on the scale. This puts the diaphragms 8 under initial tension in a negative direction as explained above. It will be noted that the "zero" adjustment of the needle is finally obtained by manipulation of the screw 29, and the perforation 61 provides for access to said screw so that such adjustment will be made from the front of the instrument at any time.

It will be seen from the diagram of Figure 4 that the effort which opposes the air pressure is contributed chiefly by the springs 18 and 26, while the diaphragm adds comparatively little to the slope of the resultant line RS. Accordingly, the diaphragm itself is relieved of the major portion of the pressure exerted by the air. In order to change the calibration of the instrument or the range of air pressures which it will accommodate, the rate of variation of one or both of the springs 18 and 26 may be changed. Such change has the effect on the diagram of changing the slope of one or both of the lines AB and DE. Such change of slope will, of course, correspondingly, change the slope of the resultant line RS. During these changes the diaphragm line JK may remain constant. It will be understood, however, that, when excessive air pressures must be dealt with, which are great enough to distort the diaphragm, a heavier diaphragm may be used, and in such a case, of course, the position of the line JK will vary.

In the use of the apparatus of the present invention, the springs 18 and 26 are adjusted so as to provide the desired initial tension and the desired rate of variation. Such adjustment may be rather roughly made. Such adjustment is made, furthermore, in such a manner that the needle 48 is approximately at the zero point of the scale. The screw 29 is then adjusted to engagement with the abutment 30, and sufficient pressure is applied to give the diaphragm 8 the desired negative setting. This, at the same time, brings the needle 48 to a position about half way around the scale. The needle 48 is then removed from the spindle 47 and replaced thereon in a position to give a zero indication. The instrument is then calibrated by testing against known pressures and the needle is adjusted to follow accurately the scale 57 by adjustment of the screw 42, which changes the lever ratios in such a way that the unit movement of the needle 48 can be accurately adjusted. The zero position may be accurately adjusted by means of the screw 29. A perforation 61, in the dial 56, in alinement with the screw 29 permits such zero adjustment to be made at any time from the front of the instrument.

It will be seen, therefore, that this invention provides an instrument of simple construction which can be made very rugged and which is not liable to get out of calibration even under severe usage. By initially tensioning the actuated element, the same may be rendered relatively insensitive to inaccuracies in the rate of variation of the tension of the diaphragm. The actuated element may not only be tensioned initially so as to reduce the effect of the diaphragm tension, but the rate of variation of the spring tension may be adjusted to any desired value, so that the unit movement of the indicating element can be adjusted to fit any desired scale. By initially deflecting the diaphragm with a negative setting, its variation in resistance may be rendered substantially uniform throughout its range of action. The various adjustments are arranged so that each may be made independently of the others, so that the effect of each adjustment is accurately under control.

It will further be noted that the structure of the instrument is such that variations in temperature will have little or no effect upon the accuracy of the instrument. The diaphragm being mounted at the lower portion of the frame and the element 25 having its connection with the indicating mechanism at its upper end, both the frame and the element 25 expand under temperature changes in the same direction from substantially the same point. Accordingly, as these elements are made of similar materials and their rates of expansion are substantially alike, changes of temperature will have practically no effect on their relative positions. Similarly, the arm 32 extends in one direction from its connection with the element 25 and the chain 45 extends in a reverse direction. If these parts are made of similar materials, their expansions will compensate for one another.

It will be understood that certain features of this invention may be useful without reference to other features thereof, and the use of such sub-combinations is contemplated by this invention. It is further obvious that various changes may be made in the details of construction, within the scope of the appended claims, without departing from the spirit of this invention. It is, therefore, to be understood that this invention is not to be limited to the specific details shown and/or described.

Having thus described the invention, what is claimed is:

1. In an indicating instrument of the character described, an actuating element, an actuated element, an adjustable connection between said actuated element and said actuating element, means for tensioning said actuated element to initially offset the actuating element, an indicator, and positive operating connections from said actuated element to said indicator.

2. In an indicating instrument of the character described, a diaphragm, an actuated element adapted for adjustable connection therewith, a plurality of yielding tensioning means adapted to urge said element in opposed directions in order to position said element under balanced forces, means for varying the rate of variation of such forces with movement of said diaphragm, and an indicator connected with said element.

3. In an indicating instrument of the character described, a diaphragm, an actuated element adapted for adjustable connection therewith, a plurality of springs adapted to yieldingly urge said element in opposed directions in order to position the same under balanced forces, means for varying the active length of one of said springs, and an indicator connected with said element.

4. In an indicating instrument of the character described, a diaphragm normally occupying a neutral position and adapted to be moved from such position in a positive direction by the force to be indicated, an actuated element connected for actuation by said diaphragm, a plurality of springs adapted to yieldingly urge said element in opposed directions in order to position the same under balanced forces, the tension of one of said springs being effective to normally offset said diaphragm from its neutral position in a negative direction, and an indicator connected for operation by said element.

5. In an indicating instrument of the character described, a diaphragm normally occupying a neutral position and adapted to be moved from such position in a positive direction by the force to be indicated, an actuated element connected for actuation by said diaphragm, a plurality of springs adapted to yieldingly urge said element in opposed directions in order to position the same under balanced forces, means for adjusting the tension of one of said springs adapted to offset said diaphragm from its neutral position in a negative direction, means for varying the active length of one of said springs, and an indicator connected for operation by said element.

6. In an indicating instrument, an element actuated for movement in response to the force to be indicated, tensionable means adapted to urge said element in a direction to oppose such movement, and a second tensionable means acting on said element disposed to initially oppose and eventually augment the effect of said first means.

LEWIS A. MAPEL.

CERTIFICATE OF CORRECTION

Patent No. 2,020,560. November 12, 1935.

LEWIS A. MAPEL.

It is hereby certified that error appears in the printed specification of the above numbered patent requiring correction as follows: Page 3, first column, line 66, for "deoection" read deflection; same page, second column, line 24, after "deflection" and before the period insert the parentheses and words (or displacement) of the actuated member 25; line 25, after "OC" insert a period; line 26, strike out the parentheses, words and period "(or displacement) of the actuated member 25."; and that the said Letters Patent should be read with these corrections therein that the same may conform to the record of the case in the Patent Office.

Signed and sealed this 7th day of January, A. D. 1936.

Leslie Frazer
(Seal)                  Acting Commissioner of Patents.